Nov. 10, 1959 K. J. WALDSCHMIDT 2,912,289
THRUST BEARING
Filed March 21, 1958
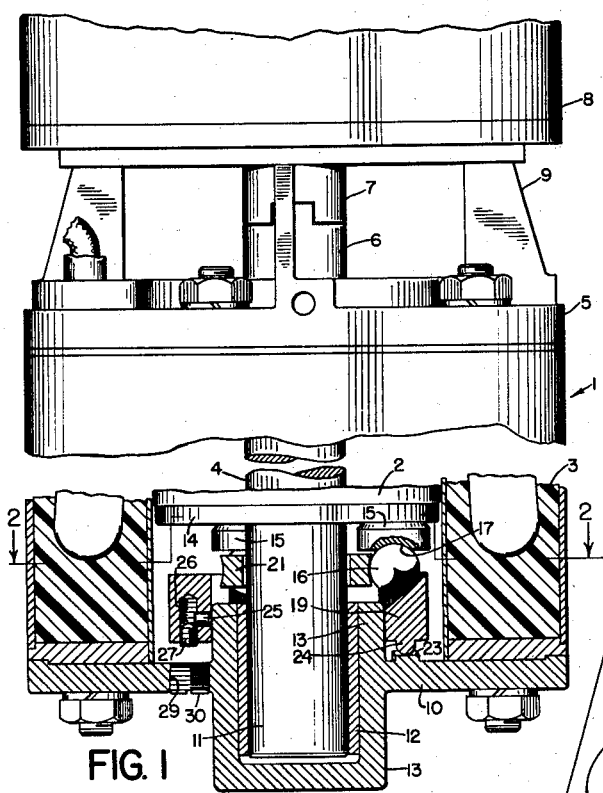
FIG. 1
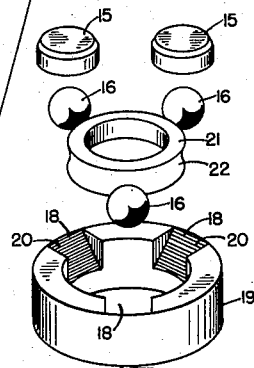
FIG. 3
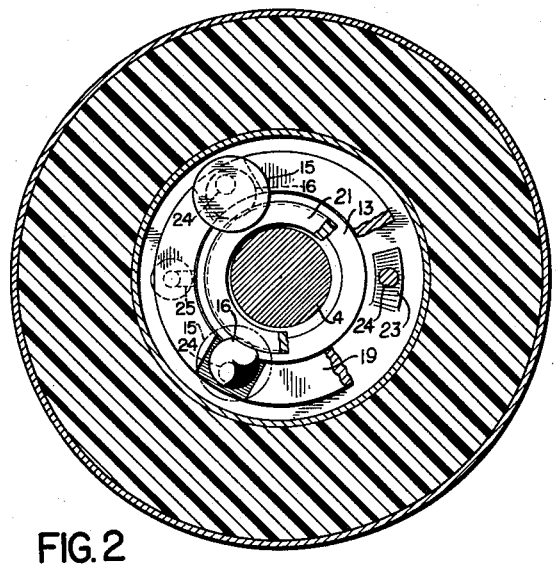
FIG. 2
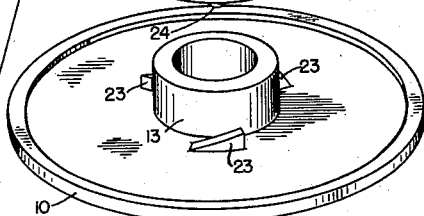
FIG. 4
FIG. 5
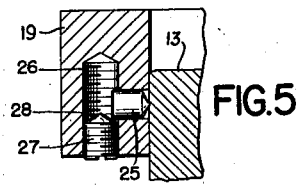
INVENTOR.
KENNETH J. WALDSCHMIDT
BY
Andrus + Starke
Attorneys

United States Patent Office 2,912,289
Patented Nov. 10, 1959

2,912,289
THRUST BEARING

Kenneth J. Waldschmidt, Milwaukee, Wis., assignor to A. O. Smith Corporation, Milwaukee, Wis., a corporation of New York Application March 21, 1958, Serial No. 722,889

11 Claims. (Cl. 308—160)

This invention relates to a thrust bearing and in particular to a segmental type thrust bearing requiring axial adjustment of the position of the thrust bearing relative to a stationary support.

Thrust bearings of the segmental type normally consist of an annular member, and a plurality of segmental members arranged in a corresponding annular manner. The annular member and the segmental members are respectively secured to a rotating member and a relatively stationary base member to take up the thrust forces established on and by the rotating member. The segmental bearing members are individually pivotally supported upon a load equalizing member or assembly which is, in turn, universally pivotally supported upon the base member. For example, in submersible-pump motors which are adapted to be vertically disposed within a well, the lower end of the motor is provided with such a thrust bearing to take up the thrust forces established by pumping of the water. A load equalizing assembly distributes the thrust load to the various thrust segments to maintain the alignment of the motor shaft.

The operation of thrust bearings results in wear of the sliding faces of the bearing members and requires relative readjustment to maintain a predetermined location of the rotating member and the base member.

In submersible-pump motors having a motor shaft which protrudes upwardly through the upper end of the motor and which is coupled to a depending pumping shaft, the extent the shaft protrudes is relatively important in establishing a firm and reliable coupling of the shafts. The manufacturing processes employed in making commercial motors of the above variety, however, require certain tolerances in the various motor components. To compensate or adjust for the accumulated tolerances in the motor components, the thrust bearing is axially positioned with respect to the lower end of the motor to accurately position the upper shaft extension in accordance with a predetermined design.

Axial adjustment in submersible motors has been generally done by a thrust bearing support member threaded within an opening in the lower portion or base of the submersible motor. The shaft is precisely located in accordance with the predetermined design by suitably threading the support member into position and then locking the member in position. This method of adjustment requires accurate machine threading.

Further, submersible motors and similar applications often require fluid tight structures. It is difficult to seal the threaded adjustment support member particularly if subsequent adjustments are necessary.

Thrust bearings are nevertheless required to be relatively simple and low cost in the present highly competitive market. The present invention provides a simple and rugged segmental-type thrust bearing employing a relatively inexpensive, simple and reliable supporting and positioning means.

In accordance with one aspect of the present invention, the segmental shoes are each universally supported by a support member which is disposed for simultaneous vertical and radial movement upon a radially extended inclined plane. A retaining and load equalizing member engages or cooperates with each supporting member to transmit the forces between the supporting members and thereby maintain a fixed relative position between the shoes. In this manner, the thrust load on the shaft is distributed between the segmental shoes.

In accordance with a second aspect of the invention, the radially inclined planes are part of an intermediate support which is adjustably supported upon a base member by at least three inclined planes and cooperating projections formed or secured on the base member and the intermediate support. The inclined planes extend generally circumferentially and are of a suitable slope such that relatively small rotation of one member with respect to the other effects an axially positioning of the thrust bearing and supported shaft with respect to the base member. The intermediate member is locked in position in any suitable manner. A very simple and reliable locking means comprises a radially movable pin member which may be forced into locking engagement with an upstanding hub portion of the base member. An axial tapped opening intersects the path of the pin member and is provided with a setscrew having a cam surface engaging the outer end of the pin to releasably hold the pin in position. A small opening in the lower base member is generally aligned with the setscrew to allow access to the locking means for relative adjustment between the base member and the intermediate support. The opening may be sealed in any suitable means such as by a threaded bottoming plug.

The drawing furnished herewith illustrates the best mode presently contemplated for carrying out the invention.

In the drawing:

Figure 1 is a fragmentary elevational view partly in section showing a vertically stacked submersible motor and pump combination which is adapted to be disposed within a well or the like;

Figure 2 is a view taken on line 2—2 of Figure 1;

Figure 3 is an exploded view of the lower portion of the thrust bearing and the lower end member of the submersible motor;

Figure 4 is an enlarged fragmentary view of a portion of the thrust bearing of Figs. 1–3; and Figure 5 is an enlarged fragmentary view of locking means shown in Figs. 1 and 2.

Referring to the drawing and particularly Figure 1 thereof, a submersible motor 1 of the conventional squirrel cage induction variety is shown comprising a rotor 2 journalled within an annular stator assembly 3. The rotor 2 is mounted upon a shaft 4 which extends outwardly through an upper end bell 5 of the motor 1 as at 6. The upper end 6 of the shaft 4 is coupled to the lower end of a pump shaft 7 of a pump 8 which is supported on the upper end bell 5 by a spacer bracket 9. Any suitable coupling such as the illustrated cooperating slot and groove type may be employed in coupling the shafts 6 and 7 to each other. When the motor 1 is energized, the rotor 2 rotates and drives the attached shaft 4 and coupled shaft 7 to operate the pump 8. The well water or the like, not shown, is lifted upwardly by the pump 8 and creates a reaction force which is transmitted through the pump shaft 7 to the rotor 2. This force is taken up by a lower end closure member or bell 10 of the motor 1 through a thrust bearing assembly, as hereinafter described.

The rotor shaft 4 extends downwardly from the rotor 2 as at 11 and is journalled within a radial bearing 12 in a tubular hub 13 integrally formed with the end member 10 and extending axially of the principal plane of the end member.

The thrust bearing assembly encircles the lower end 11 of the shaft 4 and includes a rotating annular member 14 which is rigidly secured to the lower end of the rotor 2 by any suitable means such as brazing or the like. The member 14 slidably engages three equi-circumferentially spaced circular thrust shoes or pads 15 each of which is universally supported for pivotal movement on a correspondingly located spherical ball 16. A spherical recess 17 is formed on the under surface of each thrust pad 15 to interlock the thrust pads 15 and the supporting balls 16 such that the friction forces between members 14 and 15 cannot drive the pads 15 in a circumferential direction.

The pivotal support balls 16 are disposed within three correspondingly spaced slots or recesses 18 extending radially in the upper portion of an annular ball retainer 19. The ball retainer 19 encircles the inner portion of the hub 13 of the end member 10 in closely spaced relation. The slots 18 in the retainer 19 each include an inclined base 20 extending radially of the retainer 19 and sloping inwardly and downwardly toward the shaft 11. The balls 16 are each free to roll up and down the corresponding inclined pase 20 and thereby correspondingly raise and lower the supported thrust pad 15.

A free-floating and load equalizing ring 21 is disposed within the annular retainer and encircles the shaft portion 11 immediately above the hub 13. The ring 21 wedges the balls 16 between the slanting bases 20 and the peripheral surface 22 of the ring. The equalizing ring 21 maintains the spherical balls 16 and the thrust pads 15 on a relatively fixed bolt circle or diameter such that as one ball moves down an inclined base 20 due to an increase in load on the corresponding thrust pad, the ring 21 moves laterally of the shaft 11 and at least one of the other balls moves upwardly and outwardly on its supporting base 20 a corresponding amount. Thus, due to the horizontal forces exerted upon the equalizer ring 21 by the three spherical balls 16, the rings 21 and balls 16 always move as a unit. The load on each thrust pad 15 is therefore maintained equal to the load on each of the other thrust pads.

When the spherical balls 16 move in opposite axial directions incident to an uneven load distribution, the ring 21 is slightly inclined with respect to a horizontal plane.

A clearance is provided between shaft 11 and ring 21 of sufficient size to allow the lateral shifting of the ring 21 and accompanying slight tilting of the ring 21.

Referring to Fig. 4, the outer peripheral edge 22 of the ring 21 is grooved with a radius slightly larger than that of the balls 16. Consequently, relatively point contact is maintained therebetween and friction is at a minimum.

The lower motor end member 10 is provided with three correspondingly spaced inclined planes 23 having suitably hardened surfaces. The planes 23 extend generally in a circumferential direction. The retainer 19 is provided with three equi-circumferential spaced projections 24 depending from its under surface and terminating in hardened spherical ends which rest on the hardened surfaces of the inclined planes 23. Therefore, the axial position of the ball retainer 19 with respect to the base member 10 is dependent upon the relative circumferential position of the two members. As the retainer 19 is rotated in one direction, the projections 24 ride up the inclined planes 23 to separate the retainer 19 from the base member 10. Correspondingly, a reverse rotation of the ball retainer 19 reduces the spacing of the retainer 19 from the end member 10.

As the ball retainer 19 is moved axially the corresponding parts of the thrust bearing also move axially and thereby move the attached rotor 2 and rotor shaft 4 with respect to the base member 10. In this manner, the upper protruding portion 6 of the rotor shaft 4 is precisely aligned with respect to the upper end bell 5 of the motor 1 to insure a positive and accurate coupling to the pump shaft 7.

The retainer 19 is locked in a desired position by driving a pointed pin 25 into the hub 13 of the lower end member 10 as most clearly shown in Fig. 5. The pin 25 is journalled within a radial opening on the lower internal surface of the retainer 19 which is adjacent the inner portion of hub 13. An axial threaded opening 26 intersects the radial opening behind the pin 25 and is adapted to receive a correspondingly threaded setscrew 27. The inner end of the setscrew 27 is tapered or pointed to form a conical cam surface 28 which engages the outer end of the pin 25. The pin 25 is driven outwardly and into releasable locking engagement with the hub 13 by threading the setscrew 27 into the opening 26.

To permit access to the setscrew 27, tapered opening 29 is provided in the lower end of member 10 in alignment with the setscrew 27. The setscrew 27 may be employed as a lever in rotating the retainer 19 relative to the base 10. The setscrew 27 is constantly accessible through the opening 29 through the limited range of adjustment normally required.

After the final location of retainer 19 is made, the opening 29 is sealed in any suitable manner such as by a tapered bottoming plug 30.

If a subsequent axial positioning of the thrust bearing is required, the plug 30 is removed and the setscrew 27 released or withdrawn such that the ball retainer 19 may be rotated relative to the base member 10. The adjustment is made by rotating the retainer 19 and the setscrew 27 threaded into the opening 26 to drive the pin 25 into locking engagement with hub portion 13.

The present invention provides a thrust bearing assembly having a pivotally supported segmental bearing assembly including load equalizing means and having positive and simple adjusting means.

Various modes of carrying out the invention are contemplated as being within the scope of the following claims particularly pointing out and distinctly claiming the subject matter which is regarded as the invention.

I claim:

1. A thrust bearing having a plurality of circumferentially arrayed thrust pads supported on a base member, which comprises a retaining structure including a plurality of radially extending inclined plane surfaces arrayed in accordance with said thrust pads, at least three equi-circumferentially spaced cooperating supporting projections and circumferentially extending inclined plane surfaces on said base member and said retaining structure to position said retaining structure in selected spaced relation to the base member, individual supporting means slidably disposed upon the radially extending inclined plane surfaces, means to maintain said individual supporting means in constant radially spaced relation, and means to pivotally support said thrust pads on the correspondingly located supporting means.

2. A thrust bearing having a plurality of circumferentially arrayed thrust pads supported on a base member, which comprises a retaining structure including a plurality of radially extending inclined plane surfaces arrayed in accordance with said thrust pads, at least three equi-circumferentially spaced cooperating and inclined plane surfaces on said base member and said retaining structure to position said retaining structure in selected spaced relation to the base member, a spherical ball slidably disposed upon each of the radially extending inclined plane surfaces, means to maintain said spherical balls in constant radially spaced relation, and said thrust pads having a spherical recess complementing the corresponding spherical ball to pivotally support said thrust pads and to prevent circumferential translation of the thrust pads.

3. A thrust bearing having a thrust means supported on a base member, which comprises a retaining structure to carry said thrust means, at least three equi-circumferentially spaced cooperating supporting projections and inclined plane surfaces on said base member and said retaining structure to position said retaining structure in selected spaced relation to the base member, and means to secure said retaining structure to said base member and prevent relative movement therebetween.

4. A thrust bearing having a thrust means supported on a base member, which comprises a retaining structure to carry said thrust member, three equi-circumferentially spaced hardened inclined plane surfaces on said base member, three equi-circumferentially spaced projections extending downwardly from said retaining structure and terminating in a hardened spherical surface resting on said hardened inclined plane surfaces to position said retaining structure in selected spaced relation to the base member by relative angular movement therebetween, and means to releasably lock said retainer to said base member to prevent relative movement therebetween.

5. A thrust bearing having a thrust means supported on a base member having a central radial bearing hub portion which comprises a retaining structure to carry said thrust member, at least three equi-circumferentially spaced cooperating projections and inclined plane surfaces on said base member and said retaining structure to position said retaining structure in selected spaced relation to the base member, a pin journalled within a radial opening in said retaining structure adjacent said hub portion of the base member and adapted to be moved into locking engagement with the hub portion, a setscrew adapted to be threaded into an opening intersecting the pin opening immediately adjacent the outer end of the pin, a cam surface on said setscrew arranged to engage the outer end of the pin to selectively radially position the pin, and an opening in the base member in axial alignment with the setscrew to establish access to the setscrew.

6. A thrust bearing having a plurality of annularly arrayed thrust pads supported on a base structure, which comprises a plurality of inclined plane surfaces circumferentially arrayed and extending radially of the annularly arrayed thrust pads, thrust pad supports slidably disposed one upon each of said inclined plane surfaces, load equalizing means to maintain said thrust pad supports in radially spaced relation, and means to maintain the thrust pads pivotally supported on said thrust pad support.

7. A thrust bearing having a plurality of thrust pads supported on a base structure, which comprises an annular support having a plurality of radially extending slots with an inclined base, a plurality of spherical balls disposed one within each of said slots, means to maintain said spherical balls in radially spaced relation, and means to pivotally maintain the thrust pads on said spherical balls.

8. A thrust bearing having a plurality of thrust pads supported on a base structure, which comprises an annular support having a plurality of radially extending slots with an inwardly downwardly inclined base, a plurality of spherical balls disposed one within each of said slots and resting upon the corresponding inclined base, a free-floating ring member disposed within the annular support and having a grooved peripheral surface engaging said spherical balls to maintain the spherical balls in a predetermined radially spaced relation and distribute the thrust load equally amongst the thrust pads, and means to pivotally maintain the thrust pads on said spherical balls.

9. A thrust bearing having a plurality of thrust pads supported on a base structure, which comprises an annular support having a plurality of radially extending slots with an inwardly downwardly inclined base, a plurality of spherical balls disposed one within each of said slots and resting upon the corresponding inclined base, a free-floating ring member disposed within the annular support and having a grooved peripheral surface engaging said spherical balls to maintain the spherical balls in a predetermined radially spaced relation, said groove having a radius slightly greater than said spherical balls to establish substantially point contact therebetween, and distribute the thrust load equally amongst the thrust pads, and means to pivotally maintain the thrust pads on said spherical balls.

10. A thrust bearing having a plurality of circumferentially arrayed thrust pads supported on a base member, which comprises a retainer having a plurality of openings circumferentially arrayed in accordance with said thrust pads, each of said openings having a generally inclined base extending radially of said thrust pads, support means interposed between each of said bases and said thrust pads to support the thrust pads upon said inclined bases, a force transmitting means radially interposed between said support means to maintain said radial spacing as said support members move on the corresponding inclined bases, at least three circumferentially spaced and circumferentially extending inclined plane faces on said base member, three corresponding spaced projections on said retainer disposed in sliding engagement with the inclined plane faces to position said retainer relative to said base member, and locking means to secure said retainer to said base member and prevent relative movement therebetween.

11. A thrust bearing having a plurality of circumferentially arrayed circular thrust pads supported on a base member having an inwardly projecting radial bearing hub to take up thrust forces on a rotating shaft, which comprises an annular retainer slidably disposed about the inner end of the hub and extending thereof and having a plurality of radially extending slots in the upper portion of the retainer circumferentially arrayed in correspondence with said thrust pads, each of said slots having an inclined base sloping downwardly toward a common center from the upper outer edge of the retainer, a spherical ball having a diameter greater than the wall of the annular retainer and being interposed between said base and said thrust pads to support the pads upon said inclined bases, said thrust pads having a spherical recess on the lower surface complementing said spherical balls to prevent circumferential translation of the thrust pads, a load equalizing ring interposed between said spherical balls and having a grooved peripheral surface engaging said spherical balls to maintain said radial spacing as said spherical balls roll on the corresponding inclined bases, three equi-circumferentially spaced and circumferentially extending inclined hardened plane faces on said base member, three correspondingly spaced projections having hardened spherical ends extending downwardly from said annular retainer and disposed in sliding engagement with the inclined bases to axially position said annular retainer relative to said base member, and locking means to secure said retainer to said base member and prevent relative movement therebetween.

References Cited in the file of this patent

UNITED STATES PATENTS

| | | |
|---|---|---|
| 1,133,804 | Kaufman | Mar. 30, 1915 |
| 1,178,038 | Taglin | Apr. 4, 1916 |